Patented Feb. 28, 1928.

1,660,762

UNITED STATES PATENT OFFICE.

ROBERT C. PALMER, OF PENSACOLA, FLORIDA, ASSIGNOR TO THE NEWPORT COMPANY, OF MILWAUKEE, WISCONSIN, A CORPORATION OF DELAWARE.

PROCESS FOR TREATING ROSIN.

No Drawing.      Application filed October 4, 1924. Serial No. 741,763.

It has been known for years that if rosin, sometimes called colophony, an exudation product of many species of pine or that rosin resulting from the extraction of pine wood with suitable solvents, which consists principally of abietic acid is subjected to a temperature exceeding 350° C. in a closed vessel it will yield by destructive distillation certain oils commonly called rosin oils. This operation requires from eight to twenty-four hours depending on the kind of product desired and the mass being treated. The rosin oils obtained in this well-known process are complex bodies containing secondary decomposition products which give them an empyreumatic smell and they darken rapidly on exposure to air.

One of the principal objects of the present invention is, therefore, to provide a method of cracking abietic acid into hydrocarbons and carbonic acid and/or possibly carbon monoxide without secondary decomposition of such hydrocarbons. The oils desired undergo partial decomposition when heated to boiling under atmospheric pressure and must, therefore, be distilled at lower temperatures.

It has been proposed to subject rosin to distillation under reduced pressure but I have found that under such temperatures the desired oils are not formed from the abietic acid in the rosin and the only substantial effect of such distillation is to distill over the abietic acid unchanged.

I have tested out various substances as catalyzers to enable the abietic acid to be cracked at a temperature below the decomposition point of the desired oil.

Many catalyzers used to aid the decomposition of other organic substances cannot be used with satisfaction in connection with abietic acid. Thus finely divided or precipitated silica has little or no effect. Caustic soda forms sodium abietate which is a stable product which cannot be distilled. Similarly, sodium salts of volatile organic acids, such as acetic, decompose forming sodium abietate with evolution of the volatile acid.

Very satisfactory results have, however, been obtained with certain metallic halides, more particularly zinc, stannous or cuprous chlorides.

Using such catalysts it has been found that decomposition begins at around 250° C. Above 350° C. secondary decomposition occurs so that the reaction temperature should be kept within these limits, preferably between 250° and 330° C.

The primary decomposition produces in addition to the pitch ordinarily formed with existing processes, a small amount of the materials which render ordinary rosin oil objectionable.

To avoid these constituents passing over with the rosin oil it is desirable that the distillation be carried out at a temperature lower than that necessary for producing the primary decomposition. Even when this precaution is observed the last fractions are dark colored and odoriferous and do not possess the desirable qualities of the earlier fractions.

The light volatile products of the primary decomposition are very largely volatilized during such decomposition and prior to the distillation proper. The final desired product is, therefore, a colorless, odorless rosin oil consisting substantially wholly of oils having a boiling point above 250° C. and incapable of distillation under atmospheric pressure without partial decomposition.

Further, the rosin oils produced in this way are neutral and will not darken on exposure to air.

In carrying out the process of this invention, I prefer to conduct the operation as follows: I heat the rosin by any suitable means in a closed vessel which may to advantage be provided with an outlet attached to a condenser, as in the usual manner of obtaining rosin oils. When the rosin has reached a temperature above 250° C. (482° F.), I begin adding the catalyzer, such as zinc chloride. The temperature is allowed to rise gradually and additional amounts of catalyzer added as the temperature increases until the total amount of catalyzer equals as much as one per cent of the weight of the rosin. The catalyst is added in stages since the reaction is exothermic and if all the catalyst is added at one time the temperature rises too rapidly and may exceed 350° C. For this reason, as also for reasons of economy, to avoid contaminating the pitch and so forth, the total amount of the catalyst should not exceed three percent (3%) of the weight of the rosin.

The action of the zinc chloride or other substance used, is not known and it is here specified as catalytic for the reason that the substance used is not consumed in the reaction. By the term catalytic material used in the specification and claims I mean any material which will produce the desired decomposition without being consumed in the process.

A small amount of light oil (rosin naphtha) and water is condensed during this step of the process. At the end of the reaction when the rosin has been converted into rosin oil, which is indicated by the amount of water which has distilled over, the temperature is quickly raised to a point not to exceed 330° C. (626° F.) and the fire extinguished. The total time after the first addition of catalyzer may not be greater than one hour depending on the amount being treated. The resultant product in the vessel is a viscous oil having an acidity of from 5 to 10 percent of that of the original rosin.

In the next step in the process, I attach the reaction vessel to a suitable still head, condenser, receiving tank and vacuum pump and distill off the rosin oil under vacuum at a temperature below 250° C. The residue is a pitch suitable for manufacture into the usual products of rosin pitch.

If great purity in the rosin oil is desired, I redistill the oil over a small amount of alkali.

The rosin oil made by the process has a specific gravity at 15.5° C. of about .97. The refractive index at 20° C. is about 1.5340 and the optical rotation is about $N_D$ 20° plus 4. The oil is colorless, has none of the objectionable odors of the best refined oils produced in the former well-known methods, and will not darken on exposure to air.

I am aware that numerous details of the process may be varied through a wide range without departing from the spirit of this invention, and I do not desire limiting the patent granted otherwise than as necessitated by the prior art.

For example, instead of distilling in vacuo, it would be possible to distill in a current of steam or inert gas although distillation in vacuo is much preferred. Further, the treatment with the catalyst may be carried out in a wholly closed vessel and the rosin naphtha withdrawn either as the first fraction of the distillation or collected with the rosin oil. In the latter case the rosin oil could be redistilled in vacuo to separate it from the rosin naphtha.

I claim as my invention:

1. A process of treating rosin which comprises adding zinc chloride to rosin, heating to a temperature between 250° C. and 330° C. and subjecting the reaction product to vacuum distillation to produce rosin oils.

2. A process of treating rosin which comprises heating the rosin without access of air to a temperature of 250° to 330° C., adding zinc chloride in increasing amounts to the reaction mass, allowing a portion of the volatile constituents to escape during this period and distilling the remaining product under reduced pressure.

3. In a process of treating rosin to produce rosin products, the step which comprises heating rosin in the presence of a bi-metal chloride catalyzer at a temperature of between 250° and 330° C.

4. In a process of treating rosin to produce rosin products, the step which comprises heating rosin in the presence of less than 3% of zinc chloride at a temperature of between 250° and 330° C.

5. A process of treating rosin to produce rosin oils, which comprises heating rosin in the presence of a bi-metal chloride catalyzer at a temperature of 250° to 330° C., distilling the reaction product under reduced pressure at a temperature below 250° C., and recovering the distillate to obtain the rosin oils.

6. A process of treating rosin to produce rosin oils, which comprises heating rosin in the presence of less than 3% of zinc chloride as catalyzer at a temperature of 250° to 330° C., distilling the reaction product under reduced pressure at a temperature below 250° C. and recovering the distillate to obtain the rosin oils.

In testimony whereof I have hereunto subscribed my name.

ROBERT C. PALMER.